A. L. BATTSON.
PRESS FOR SACKING BRAN, SAWDUST, &c.
No. 10,595. Reissued May 12, 1885.
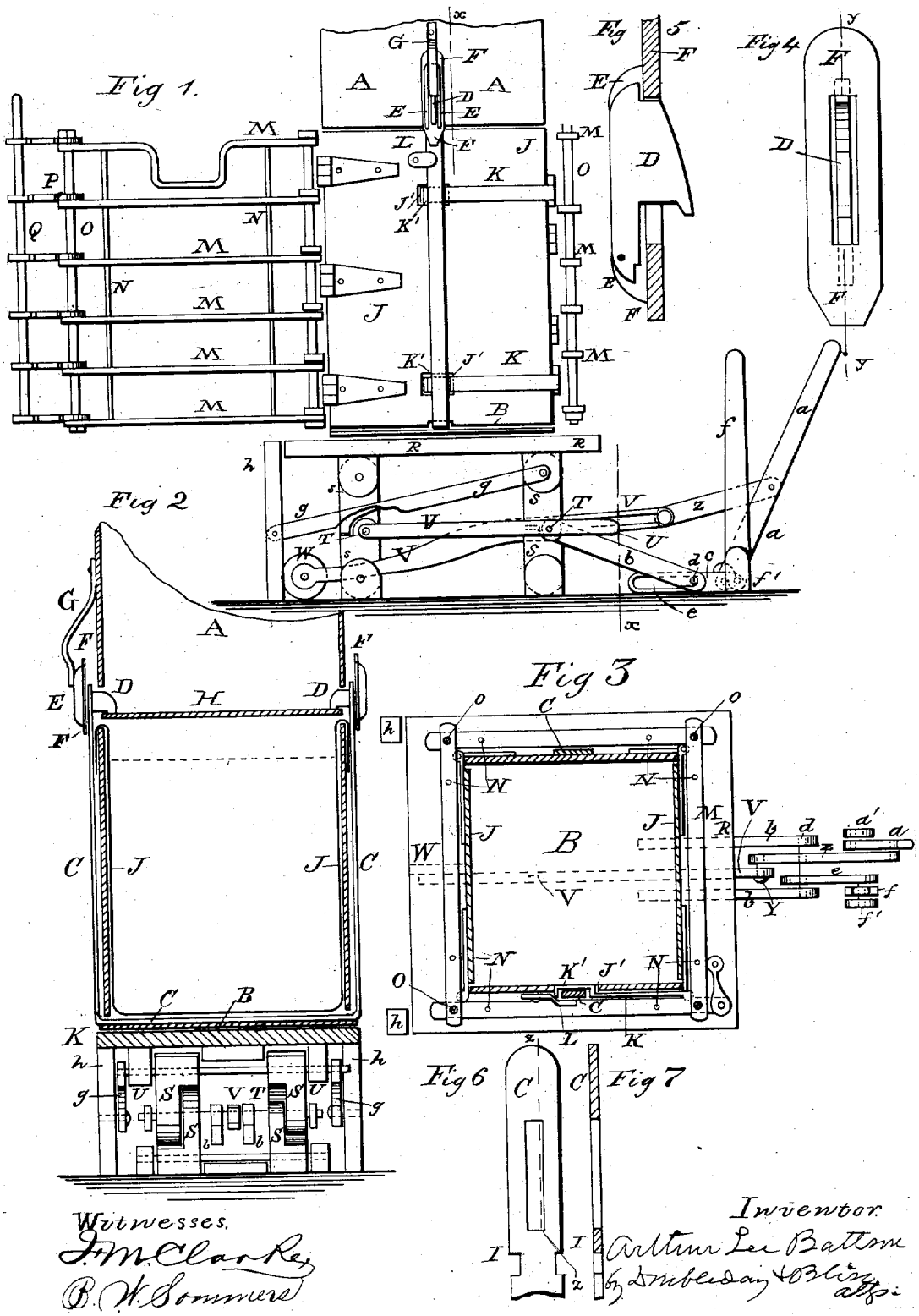
N. PETERS, Photo-Lithographer, Washington, D. C.

UNITED STATES PATENT OFFICE.

ARTHUR LEE BATTSON, OF MORRISBURG, ONTARIO, CANADA.

PRESS FOR SACKING BRAN, SAWDUST, &c.

SPECIFICATION forming part of Reissued Letters Patent No. 10,595, dated May 12, 1885.

Original No. 299,721, dated June 3, 1884. Application for reissue filed December 8, 1884.

*To all whom it may concern:*

Be it known that I, ARTHUR LEE BATTSON, a citizen of the United States, residing at Morrisburg, in the county of Dundas, Province of Ontario, Dominion of Canada, have invented certain new and useful Improvements in Presses for Sacking Bran, Sawdust, and other Substances; and I do hereby declare that the following is a full, clear, and exact description of the invention, that will enable others skilled in the art to which it appertains to make and use the same, reference being had to the accompanying drawings, and to letters of reference marked thereon, which form a part of this specification.

Figure 1 is a side elevation of the lower part of the press, and showing one side of the outer case swung back. Fig. 2 is a sectional side elevation of the same, taken through the broken line *x x*, Fig. 1, the outer case being omitted. Fig. 3 is a horizontal section of the same, the outer case being shown closed. Fig. 4 is a face view of the catch for holding the top plate in place while the package is being removed and the sack-cover sewed on. Fig. 5 is a sectional side elevation of the same, taken through the line *y y*, Fig. 4. Fig. 6 is a face view of one end of the hoop-bar. Fig. 7 is an edge view of the same, partly in section, through the line *z z*, Fig. 6.

The object of this invention is to facilitate the insertion of the sacks and the removal of the packages in the press, for which Letters Patent No. 290,515 were issued to me December 18, 1883.

The invention consists in the combination, with the press-casing and the ends of the hoop-bar, of spring-catches, whereby the sack-cover plate, when forced down by the follower, will be caught and held as the follower is again raised. The sack-bottom plate and the hoop-bar are provided with an inner case having hinged sides, and an outer skeleton case having hinged sides, whereby the sack will be securely held while being filled. The arms of the hinges at one corner of the inner case are left free, and are provided with inward offsets to enter recesses or slots in the side of the said inner case and receive an arm of the bent hoop-bar, which is secured against the said straps by a button, whereby the said inner case will be securely fastened when closed. The skeleton outer case is locked in place, when closed, by a series of cams pivoted to the end of one side and engaging with the end of the adjacent side. The base-plate of the press is supported by toggle-bars, connected with each other, and with a lever by bars and a bent bar having a roller at one end and a slot at the other, so that the said toggle-bars can be readily opened to raise the said base-plate. The toggle-bars are connected with each other and with a lever by connecting-bars, one of which is slotted, whereby the said toggle-bars can be readily closed to lower the base-plate of the press, as will be hereinafter fully described.

A is the press-case. The bottom of the sack rests upon a plate, B, secured at its middle part to the middle part of a bar, C, the end parts of which, at the opposite edges of the plate B, are bent upward, and are slotted to receive the catches D. The catches D are pivoted at their lower ends to flanges E, formed upon the outer sides of the ends of the bar C, or upon small plates F, secured to the said ends. The catches D when in position for use pass in through slots in the lower end of the press-case A, are held inward by springs G, attached to the said case A, and have their upper corners beveled or rounded, as shown in Figs. 2 and 5, so that when the sack-cover plate H is lowered by the follower, as described in Letters Patent No. 290,515, the edges of the said plate H will strike, push back, and pass the said catches, and will be held by them until the package has been removed from the press and its cover sewed on. When the sack-cover has been sewed on, a forked lever (not shown in the drawings) is inserted through recesses I in the side edges of the upper parts of the bar C, and the plate H is pressed downward, releasing the catches D, and allowing the said catches to swing outward, so that the said plate H can be readily removed.

Upon the plate B and between the arms of the bar G is placed the inner case, J, within which is placed the sack to be filled, and which gives form to the package. The case J is formed of four plates hinged to each other at their adjacent edges, except at one corner, where the straps K of the hinges that overlap one side are left free, and are made of such a length as to pass the arm of the bar C, at which point they are bent inward and then outward, forming offsets K′ to receive the said arm and enter slots J′ in the plate of the case J, so that the said arm will rest smoothly against the side of the said case, and so that the said arm will serve as a latch to hold the case J closed. The arm of the bar C is held from springing outward and releasing the straps K by a button, L, pivoted to the case J. The inner surface of the walls of the case J is roughened by burrs, corrugations, or in any other suitable manner, to hold the sack from slipping downward while the material is being pressed into it. When the sack has been inserted in the case J, its upper edge is turned down over the upper edge of the said case J, where it is held by an outer skeleton case, which is formed of horizontal bars M, six (more or less) at each side, which are kept at the proper distance apart by upright rods N attached to them near their ends. The horizontal bars M are hinged to each other at their adjacent ends by rods O, except at one corner, where the ends of the bars M of one side are left free, and to the rod O, attached to the ends of the bars M of the adjacent side, are hinged as many cams P as there are bars M on each side, and in such positions that when the outer case is closed around the inner case the cams P will come opposite the free ends of the adjacent bars M, and will lock the said outer case closed. The outer ends of the arms of the cams P are connected by a rod, Q, so that all the said cams can be operated at the same time. The upper end of the rod Q projects to serve as a handle for convenience in operating the cams P.

The hoop-bottom plate B and the inner and outer cases rest upon a plate, R, to lugs upon the lower side of which are pivoted the upper ends of four pairs of toggle-bars, S. The lower ends of the toggle-bars S are pivoted to the floor of the building, the base of the press, or other suitable support. The bars S of each pair are connected by a rule-joint, so that downward pressure upon the said bars when opened into line will have no tendency to close them. The corresponding pairs of bars S are pivoted at their joints to the opposite ends of a rod, T, which rods pass through two bars, U, placed at the sides of the toggle-bars S.

To the center of the forward rod T is pivoted a bar, V, the rear part of which extends downward and rearward, passes beneath the rear rod T, and has a small wheel or roller, W, pivoted to its rear end. The forward end of the bar V projects and has a slot, X, formed in it to receive the pivot Y, that pivots the said end to the inner end of the short connecting-bar Z. The outer end of the bar Z is pivoted to a lever, *a*, the lower end of which is pivoted to a support, *a′*, attached to the floor of the building.

To the forward rod T, at the opposite sides of the bar V, are pivoted the ends of two short connecting-rods, *b*, the forward ends of which are pivoted to the opposite sides of the short connecting-bar *c* by a pivot, *d*. The pivot *d* passes through holes in the ends of the bars *b*, and through a slot, *e*, in the inner part of the bar *c*. The outer end of the bar *c* is pivoted to the lower end of the lever *f*, which is pivoted to a support, *f′*, attached to the floor of the building.

To lower plate R, the lever *a* is moved inward to bring the pivot Y into the inner part of the slot X and prevent the said lever *a* from being jerked inward by the movement of the toggle-bars. The lever *f* is then moved outward, which operates the bars *c b* U and pushes back the joints of the toggle-bars S and closes them, lowering the plate R. The plate R is raised by moving the lever *a* outward, which draws the bars Z V U and the rods T forward, opening the toggle-bars S and raising the said plate R. The plate R is made to move up and down vertically by the bars *g*, the forward ends of which are pivoted to supports at the forward corners of the said plate R. The rear ends of the bars *g* are pivoted to posts *h* of the press-frame or other suitable supports.

In using the improvement the sack-cover is secured to the plate H, and the said plate is attached to the follower and run up into the casing A, in the manner described in Letters Patent No. 290,515, hereinbefore referred to. The table R is then raised by operating the lever *a*. A sack is inserted in a case, J, and its edge folded over the upper edge of the said case J, as shown in Fig. 2. The case and sack are placed in the hoop B C, and the hoop, case, and sack are placed upon the table R directly beneath the case A, the space between the table R and the case A being just sufficient to allow the said hoop, case, and sack to be readily slipped into place. The outside case, M N O, is then closed and fastened, and the machine is ready to receive the bran. After the bran has been forced into the sack by the descent of the follower, and the catches D have caught the plate H, the driving mechanism is thrown out of gear automatically in the manner described in Letters Patent No. 290,515, the outside case, M N O, is opened, and the lever *f* is operated to lower the table R, the hoop, the inner case, the filled sack, and the plate H withdrawing the said parts from the pressure of the follower. The hoop, inner case, filled sack, and plate are removed from the table R and replaced with another inner case, hoop, and empty sack to be filled in turn. The cover is sewed on the filled sack, and the hoop, inner case, and top plate are detached from the package ready to be again used, and the package is set to one side ready to be removed.

What I claim is—

1. In a sacking-press, the combination, with the casing A and the inner case, J, of the sack-cover plate and automatic spring-catches permanently attached to the inner case, whereby the sack-cover plate when forced down by the follower will be caught and held as the package is lowered from pressure, substantially as set forth.

2. In a sacking-press, the combination, with the casing A, the inner casing, J, and the sack-cover plate, of the spring-catches D G, substantially as set forth.

3. In a sacking-press, the combination, with the inner casing, the sack, and the sack-cover plate, of locking devices attached to and carried by the inner casing, whereby the sack-cover plate, when forced down by the follower, will be caught and held as the package is lowered from pressure, substantially as set forth.

4. In a sacking-press, the combination, with the casing A and the inner case, J, and the sack-cover plate, of locking devices attached to and carried by the inner case and springs attached to the casing A, substantially as set forth.

5. In a sacking-press, the combination of an inner case, J, to receive the sack, and an outer skeleton case having hinged sides, and adapted to support the inner case against outward pressure during packing, and to be detached from the inner case after the packing has been effected, substantially as set forth.

6. In a sacking-press, the combination, with the bottom plate, the bent bar C, and the outer and skeleton case having hinged sides, of the inner case adapted to receive the sack, substantially as set forth.

7. In a sacking-press, the combination, with the bottom plate, B, and the inner case, J, having hinged sides, of the catches D G, pivoted at their lower ends, substantially as set forth.

8. In a sacking-press, the combination, with the inner case, of the outer skeleton case having the hinged sides, the press-case A, the plate R, and means, substantially as described, for raising and lowering the plate R, as set forth.

9. In a sacking-press, the combination, with a press-case, A, of the inner case, an outer skeleton case having hinged sides, and permanently fixed in position, and adapted to support the inner case against pressure when the material is being forced into the sack, substantially as set forth.

10. In a sacking-press, the combination, with the bottom plate, B, and the bent-bar C, of the inner case, J, having hinged sides, and the outer skeleton case, M N O, having hinged sides, substantially as herein shown and described, whereby the sack will be securely held while being filled, as set forth.

11. In a sacking-press, the combination, with a side plate, of the inner case, J, having recesses or slots J′, and an arm of the bent bar C, of the free hinge-straps K, having offsets K′, and the button L, substantially as herein shown and described, whereby the said case will be securely fastened shut and held in place, as set forth.

12. In a sacking-press, the combination, with the skeleton case M N O, having hinged sides, of the series of cams P and their connecting-rod Q, substantially as herein shown and described, whereby the case can be readily locked and released, as set forth.

13. In a sacking-press, the combination, with the base-plate R, of the toggle-bars S, the connecting-bars U Z, the bent bar V, having roller W and slot X, and the lever *n*, substantially as herein shown and described, whereby the said toggle-bars can be readily opened to raise the said plate, as set forth.

14. In a sacking-press, the combination, with the toggle-bars S, of the connecting-bars U *b*, the connecting-bar *c*, having slot *e*, and the lever *f*, substantially as herein shown and described, whereby the said toggle-bars can be readily closed to lower the base-plate of the press, as set forth.

In testimony whereof I affix my signature in presence of two witnesses.

ARTHUR LEE BATTSON.

Witnesses:

F. TYRRELL,

R. G. NASH.